Oct. 16, 1956 M. DUFF 2,766,726
ANIMAL HIDE SCRATCHER AND OILER
Filed Aug. 25, 1955 2 Sheets-Sheet 1

INVENTOR.
Mort Duff
BY Scott L. Norvied
Atty.

Oct. 16, 1956 M. DUFF 2,766,726
ANIMAL HIDE SCRATCHER AND OILER
Filed Aug. 25, 1955 2 Sheets-Sheet 2

INVENTOR.
Mort Duff
BY
Scott L. Norvell
atty

United States Patent Office 2,766,726
Patented Oct. 16, 1956

2,766,726

ANIMAL HIDE SCRATCHER AND OILER

Mort Duff, Phoenix, Ariz.

Application August 25, 1955, Serial No. 530,459

2 Claims. (Cl. 119—157)

This invention concerns cattle oilers of the type wherein the cattle rub against an object to scratch themselves and are at the same time medicated with oil or an insecticide.

Heretofore cattle and other animal applicators have been made wherein various means have been provided to furnish and/or rub medicated oil into the hair and hide of the animal when it rubbed against an applicator. None of these devices, however, has been fully satisfactory and in view of this I have devised the presently disclosed applicator which has for its objects:

First, the provision of a simple, cheaply made and ruggedly constructed medicated oil or insecticide applicator, for animals wherein one end may be attached to an unyielding elevated support and the other lower end readily attached to any desired position such as a dead man sunk in the soil adjacent to said elevated support, or to a screw anchor in ground, or to a post sunk in ground.

An object is to provide an applicator wherein an oil carrying wick is contained within a helical wire guard which protects it from undue wear and furnishes a substantial scratching surface which aids in getting the medicated oil or insecticide down to the animal's hide by parting the hair and by rubbing through the hair to the hide.

Another object is to provide a medicated oil applicator for animals wherein a definite amount of oil is released from an elevated vessel when the device is contacted by an animal, as by rubbing or scratching, and wherein medicated oil or fluid insecticide, released from said vessel, is applied to the inside of a cylindrical wick on an inclined support, which is enclosed by a helical wire coil.

A still further object is to provide a cylindrical wick for a medicated oil applicator, as aforesaid, which is adapted to be held on an inclined flexible support, such as a chain, attached to an elevated fixed support at one end and to a lower resilient support at the opposite end, and arranged to receive medicated oil, or the like at the elevated end, at intervals, from mechanism actuated by movement of the support caused by rubbing contact of an animal with said applicator.

Further objects will appear hereinafter.

I attain the foregoing objects by means of the devices, structures, parts and combinations of parts shown in the accompanying drawings, in which—

Figure 4 is a vertical section of the applicator taken on line 4—4 of Figure 1, and drawn on an enlarged scale.

Similar numerals refer to similar parts in the several views.

Figure 1:
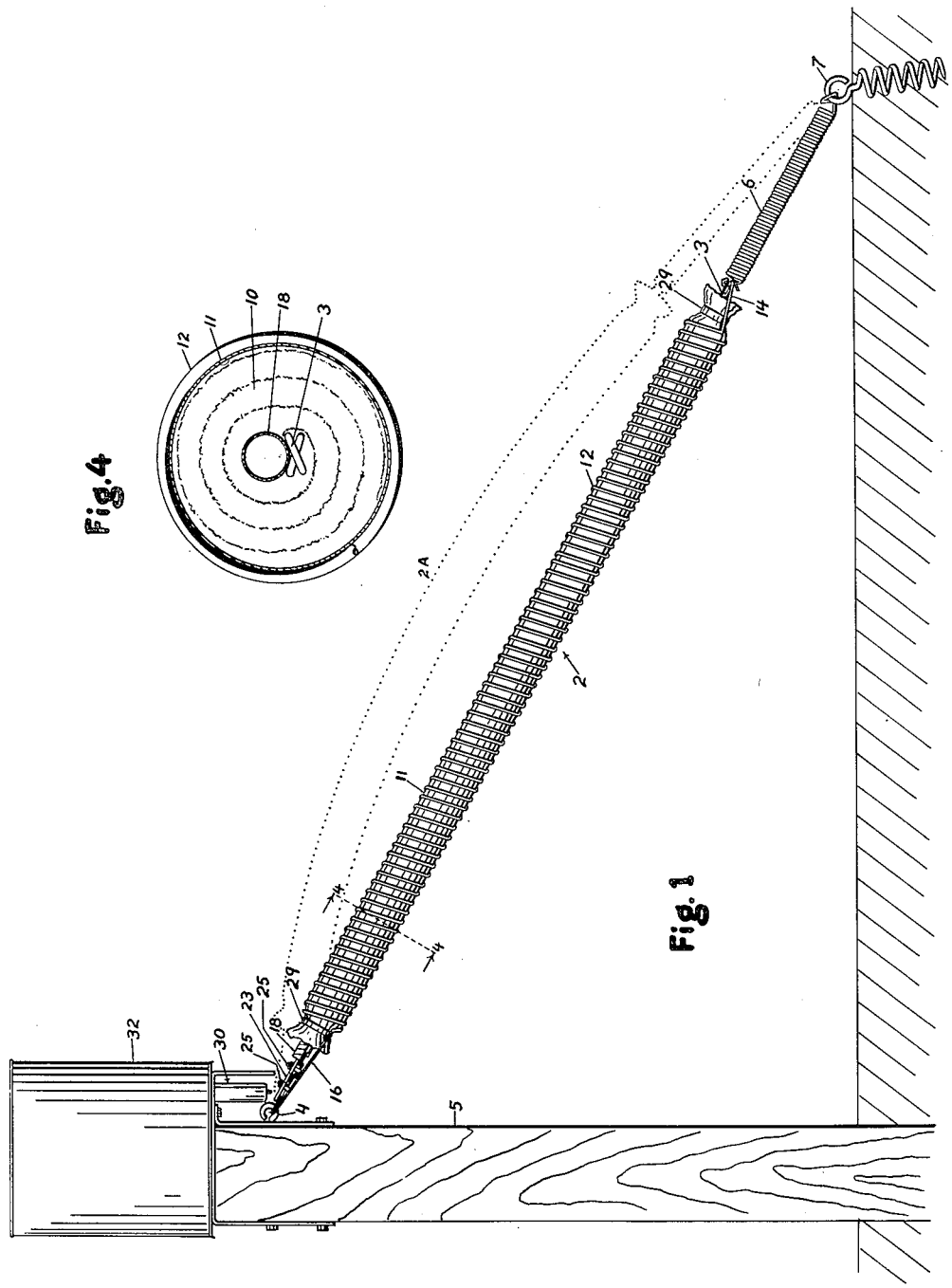
Figure 1 is a side elevation of a form of applicator embodying my improvements.
Figure 2:
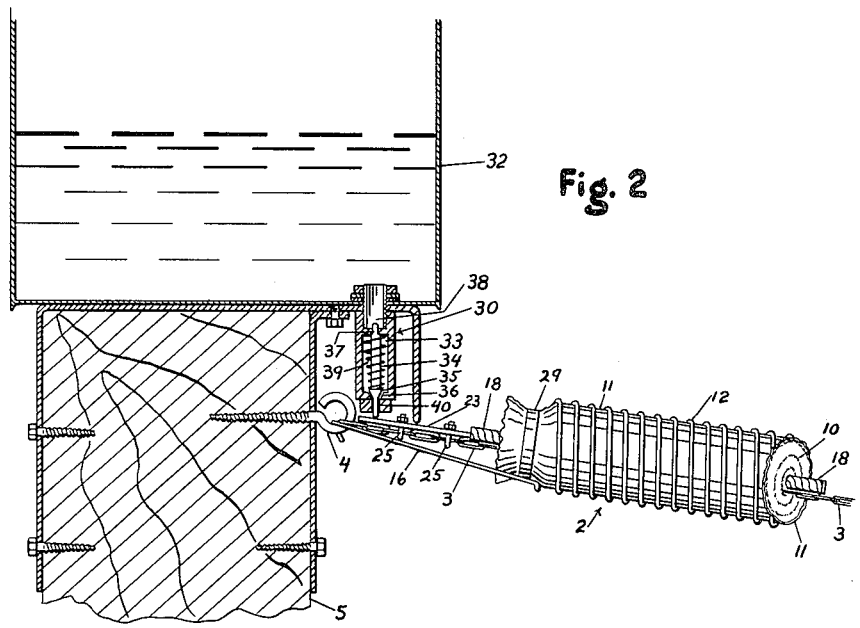
Figure 2 is a side elevational view of the upper end of the applicator with its supporting means and medicated fluid supply means shown in section, and drawn on an enlarged scale.
Figure 3:
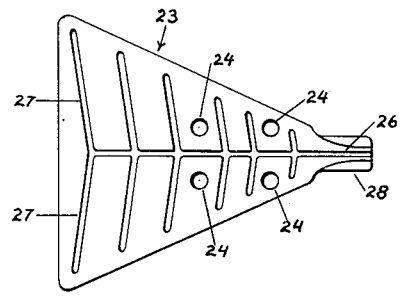
Figure 3 is a plan view of the applicator apron drawn on an enlarged scale.

The applicator consists of a cylindrical body 2 which is supported upon an axially included chain 3 extending from an eye bolt 4 on post 5, which constitutes a fixed support, at its elevated upper end, to spring 6 which provides a resilient support at its lower end. The spring is, in turn, secured in the earth by an auger-bolt 7 or by other suitable means, such as "dead man" sunk in ground, which constitutes an easily movable anchor.

The body 2 of the applicator consists of a tightly rolled wick 10 of absorbent fibrous material, such as felt, covered by suitable sheathing 11. This roll surrounds chain 3 and is held in place by a guard 12 made of spring wire coiled helically around the wick roll throughout its length. At the lower end the wire forming this guard is attached by a straight portion 14 to the top end of spring 6. At the top end of the guard the wire is brought out by a straight portion 16, which is attached to eye bolt 4.

To supply medicated oil to the interior of the wick 10 I provide a filler tube 18 which is inserted into the center of the wick roll 10 at its upper end and extends parallel to chain 3 to about the middle of its length.

Tube 18 is sealed at bottom and is perforated along its bottom side at spaced intervals to allow oil to be released slowly into the material of the wick.

A catch plate or apron 23 is attached to chain 3 by U-bolts 25 which include the chain and extend upward through holes 24 on each side of its longitudinal center. The apron has a generally triangular shape. A central channel 26 is pressed into it and extends downward along its longitudinal center. From this channel laterally extending channels 27 branch outward. The central channel extends to a narrowed spout portion 28 at the lower end of the apron. This is bent and curved upward to provide semi-circular trough which fits into the upper end of the filler tube 18. The apron is positioned below eye bolt 4, and its wide upper part extends under a valve 30 which is attached to the bottom of tank 32. The valve 30 includes a cage 33 wherein there is a sliding valve plunger 34 having a seat plug 35 at its lower end which closes on a valve seat 36 in the bottom of cage 33. The upper end of plunger 34 has a guide 37 which extends into nipple 38. Cage 33 is attached to the bottom of tank 32 by jam nuts threaded on this nipple. A spring 39 within cage 33 surrounds plunger 34 and normally urges valve plug 35 onto seat 36.

The lower end 40 of the plunger 34 beyond plug 35 is fluted or provided with a loose fit to permit the ready passage of oil from the valve seat downward and out of cage 33. The lower tip of this plunger is positioned and arranged to contact the upper face of the upper end portion of apron 24. Contact of this apron with the lower end of the plunger 34 causes it to raise and lift plug 35 from seat 36. This releases oil or fluid from the tank 32 onto the apron. From the apron this fluid flows downward into filler tube 18. Each time an animal engages the body 2 of the applicator this valve opens slightly and permits a small amount of oil to drip onto the apron and thence run into the filler tube. This keeps wick 10 adequately saturated with fluid but does not waste the fluid. Therefore, the release of oil is automatic when the device is used and the wick is always kept in a condition ready for use. The amount of fluid dispensed depends upon the number of times the body 2 is contacted by animals.

When the animal contacts the applicator body 2 at any point the wick 10 yields slightly against the pressure of the animal and this compresses it against chain 3 and tends to squeeze a small amount of oil from the wick and onto the animal's hair and hide. Since the wick is made of soft material, it must be protected against undue wear by the helical guard 12, which also prevents excess contact of the animal's hide with the wick, and at the same time affords a roughened surface against which the animal may scratch and thereby part the hair and flatten it so that the medicated fluids reach the surface of the animal's hide. Optionally, the felt on the outside of the rolled wick may be covered with a layer of any type of porous or moraminous substance, such as perforated nylon. This in turn will protect the felt portion of the wick from direct contact with the hide of the animal and will serve to meter or control the amount of oil available through the convolutions of the guard 12.

In operation, when contacted by an animal the body 2 will bend as shown by dotted outline 2a, Figure 1. Due to the resilient nature of the connection between the lower end of the applicator chain 3 and the anchor 7 this bending movement is readily available. However, neither the wick nor guard 12 rolls or twists on supporting chain 3. This movement is restrained by guard 12 which is secured at each end to its supports. The wick is secured to chain 3 by metal clamping bands 29. These bands serve not only to bind the ends of the wick to chain 3, and to keep tube 18 in place, but also effectively close the ends of the roll 10. The spring-like guard 12 is firmly anchored at the top supporting to eye bolt 4 and to spring 6 at the bottom end and, therefore, does not roll or twist when contacted. This construction provides an effective scratching surface which is available to an animal from any direction. Further, the apron 24 always presents its top face to valve cage 33, and receives all oil released through the valve from the tank either drip-wise, or if released as a steady flow.

In its simplest form the applicator body 2 may be supported, as shown in Figure 1, and provided with the filler tube 18, and may, if desired, be used without the apron 24, valve 30 or tank 32. Medicated fluid may then be introduced into tube 18 manually. The operator may do this by means of a funnel, or a cylindrical container having a nozzle (not shown). When so used the applicator, wick, and guard will function in the same manner as when fed automatically, for a limited time. Manual feeding of the pad is suitable for small operations, whereas automatic feeding and application is suitable for large feeding pens, ranges, and for use around isolated watering holes and salt licks.

In the drawings I have shown the applicator 2 supported at one end on an eye 4 which is screwed into post 5. This constitutes a fixed support. The applicator body is given an angular downwardly slanting position by a lower support which is earth screw or auger 7. This form of installation is common but not universal. Other installations can be made, for example, by attaching both ends to elevated supports, such as posts. In such cases the resilient spring element 6 may be omitted. However the spring aids the operation of the device particularly when the valve 30 is used.

As above stated the device, including the applicator may be used as a scratcher only. In this case the pad covering or sheathing 11 is made heavy and impervious. When used as a scratcher and oil medicator, the fact that the guard does not roll or rotate makes it function like a comb. The hair on the hide is parted and the oil from the pad communicated directly to the hide.

Various substitutions are well within the ambit of the conception as are various types of installations and supports.

I claim:

1. An animal hide oiler and scratcher composed of an applicator consisting of a length of chain providing a flexible support, a cylindrical wick of fibrous material surrounding the mid portion of said chain and secured thereto in non-rotating relation by clamps at each end, a wick guard and hide scratcher composed of a wire helix surrounding said wick and secured to said chain at each end in non-rotatable relation, a post constituting a fixed support having an elevated screw eye attached to one end of said chain, a spring having an outer end secured to the ground a determined distance from said post, and having its inner end attached to the end of said chain opposite the end attached to said post; said spring providing resilient means for supporting one end of said chain in a lowered position, means for supplying medicated oil to said wick composed of a filler tube extending axially into said wick parallel to said chain to approximately the middle of the length of said wick, having an open upper end for the receipt of oil, a closed lower end and a plurality of holes along its length opening into said wick; and mechanism for supplying oil to said filler tube when said applicator is contacted by an animal consisting of a tank disposed above the upper end of said chain, a valve in the bottom of said tank having an upwardly opening valve plunger normally closed, and an apron-like catch plate attached to the upper end of said chain having a rounded channel at its lower end inserted in said wick filler tube, and an apron at its upper end disposd below said valve and having its upper face contacting said valve plunger so that movement of said chain and catch plate, by animals contacting said applicator will lift said plunger and allow oil to drop from said tank onto said apron and flow into said filler tube.

2. In an animal scratcher and oiler including an applicator having an absorbent cylindrical wick supported at an incline on a flexible chain from a post set in the ground at its upper end, to a spring at its lower end, held in the earth by a ground anchor disposed at a distance from said post, mechanism for supplying medicated oil to said wick at intervals, and when said applicator is contacted by animals, consisting of a filler tube having perforated sides inserted axially into said wick, with its upper end protruding therefrom, a slanting apron attached to said supporting chain having a catch plate at its upper end and a tubular channel at its lower end inserted in the protruding end of said filler tube, a tank for medicated oil disposed on said post above said apron, a valve in the bottom of said tank including a valve cage opening into said tank bottom, having a valve seat at its lower end, a valve plunger operating in said cage having a valve plug seating on said valve seat and a portion extending downward from said plug and out of said cage, disposed over the catch plate portion of said apron and contacting said apron so that said valve plunger is lifted to open said valve seat when said apron is moved by animals contacting said applicator, and a spring within said valve cage surrounding said plunger and normally urging said valve plug onto said valve seat.

References Cited in the file of this patent

UNITED STATES PATENTS

| | | |
|---|---|---|
| 1,921,901 | Anderson | Aug. 8, 1933 |
| 2,352,859 | Palmer | July 4, 1944 |
| 2,663,284 | Stonesifer | Dec. 22, 1953 |
| 2,688,950 | McKinley | Sept. 14, 1954 |
| 2,690,162 | Kremer | Sept. 28, 1954 |
| 2,706,465 | Caldwell | Apr. 19, 1955 |